United States Patent [19]
Fyrk

[11] 3,851,804
[45] Dec. 3, 1974

[54] APPARATUS FOR FEEDING MATERIAL
[75] Inventor: Clas O. F. Fyrk, Rockford, Ill.
[73] Assignee: Swenson Spreader & Mfg. Co., Lindenwood, Ill.
[22] Filed: June 15, 1972
[21] Appl. No.: 263,194

[52] U.S. Cl................... 222/413, 239/657, 239/675
[51] Int. Cl............................................ G01f 11/24
[58] Field of Search.................... 222/412, 413, 411; 239/657, 675; 198/214

[56] References Cited
UNITED STATES PATENTS

| | | | |
|---|---|---|---|
| 2,515,150 | 7/1950 | Aasted | 198/214 X |
| 2,967,056 | 1/1961 | D'Amato | 239/657 |
| 3,180,525 | 4/1965 | Fabian et al. | 222/412 X |
| 3,349,970 | 10/1967 | Daneman | 239/657 |

Primary Examiner—Stanley H. Tollberg
Assistant Examiner—John P. Shannon
Attorney, Agent, or Firm—Morsbach & Pillote

[57] ABSTRACT

An apparatus for feeding particulate material from a hopper including an elongated trough having an open top feed section communicating with the material supply hopper and a metering section and a discharge outlet. An elongated rotary feed member extends along the trough and has feed vanes in the feed section for withdrawing material from the hopper, metering vanes in the metering section for feeding a measured quantity of the material to the discharge outlet during each revolution of the feed member, and flow equalizer vanes for substantially equalizing the rate of discharge of material through the discharge outlet during each revolution of the feed member. The feed vanes on the feed member comprise a plurality of individual blades each inclined to a radial plane through the feed member and with the blades spaced apart in a direction axially of the feed member to have a relatively closer spacing adjacent the metering section than adjacent the remote end so as to withdraw material from the hopper along the length of the feed section. The metering vanes are of generally helical configuration and the flow equalizer vanes includes several axially spaced sets of blades between the metering vanes and the discharge vanes arranged so as to generally equalize the rate of discharge of material from the metering vanes to the discharge outlet during each revolution of the feed member.

14 Claims, 7 Drawing Figures

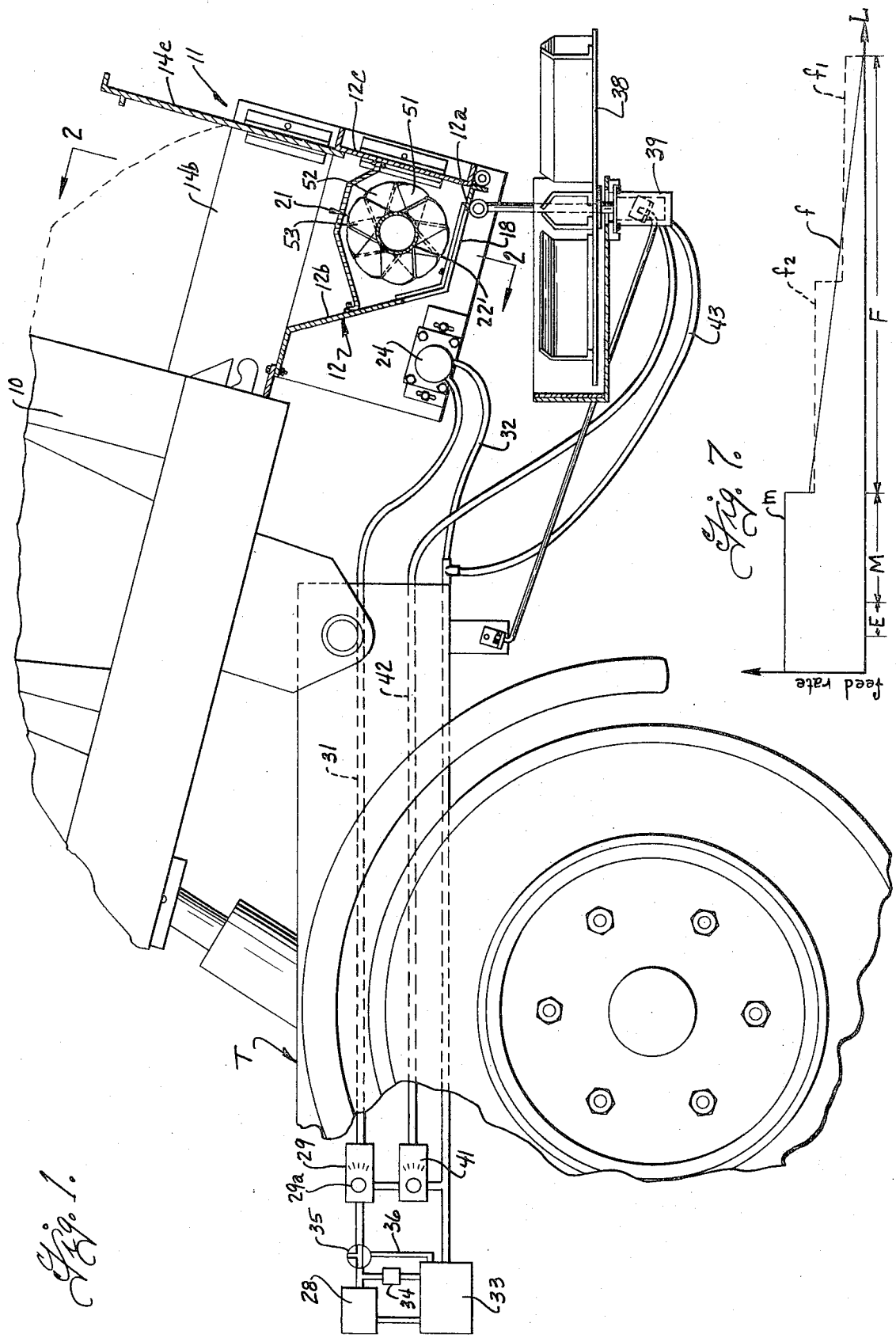

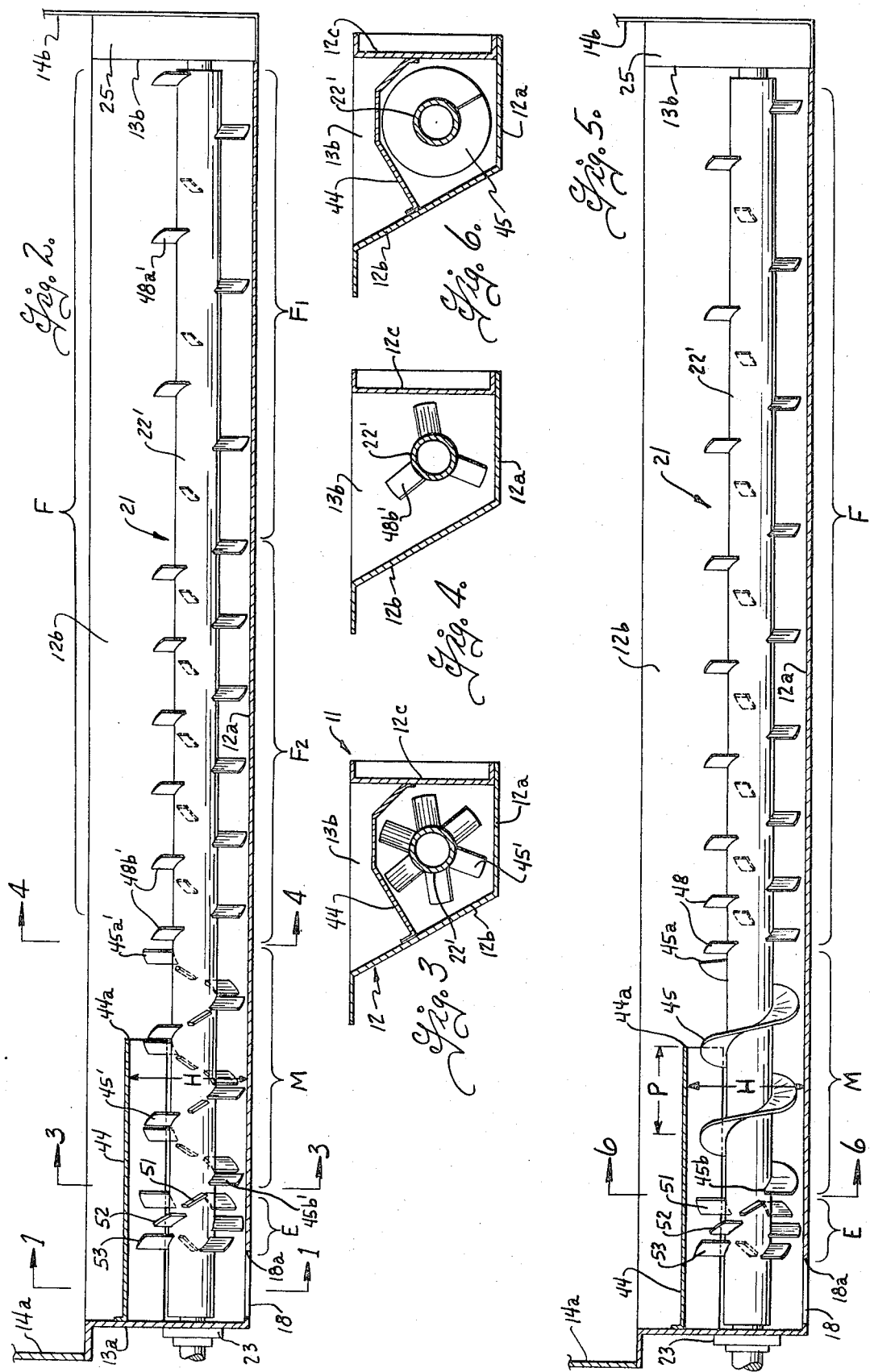

APPARATUS FOR FEEDING MATERIAL

BACKGROUND OF THE INVENTION

It has been the common practice, for example as shown in the U.S. Pat. to E. W. Swenson No. 3,510,066, issued May 5, 1970, to use a continuous flight feed auger of uniform pitch and diameter, to feed material from a hopper and to meter and discharge the material to a discharge outlet. However, such continuous flight feed augers when formed with a uniform pitch and diameter do not feed material evenly from the hopper but instead feed material primarily from the portion of the hopper that communicates with the end of the feed auger remote from the discharge outlet. This is objectionable, particularly when the hopper is mounted on a mobile unit such as a truck or trailer, since it produces an unbalance in the load on the vehicle. Moreover, since the continuous flight feed auger is filled at the end remote from the discharge outlet, the material is conveyed through a tunnel made up of the material above the auger and, because that material in the hopper is stationary and under pressure from material thereabove, it will cause considerable friction loss and sometimes be compacted in the roof of the tunnel to such a degree that it develops a bridge over the feed auger. Bridging of the material over the feed auger impedes flow of material to the auger and can adversely affect the rate of feed of material during each revolution of the auger.

To overcome these problems, it has also been proposed to use continuous flight augers which either increase in diameter along the feed section of the auger in a direction toward the discharge outlet, for example as shown in the U.S. Pat. to Boyer et al. No. 3,160,964 issued Dec. 15, 1964, or to utilize continuous flight feed augers of uniform diameter and with an increasing pitch or spacing between the auger flights in a direction toward the discharge outlet, for example as shown in the U.S. Pat. to Griffith et al. No. 2,991,870 issued July 11, 1961. Continuous flight feed augers of either variable diameter or variable pitch are expensive to make. Moreover, in a continuous flight auger, the angle of the auger blade decreases from a maximum adjacent the shaft to minimum adjacent the outer periphery of the auger. In a continuous flight auger where the blades have a substantial radial extent, it is difficult to optimize the angle of the auger blade to effect most efficient feeding of material, because of the change in blade angle from the root to the tip of the auger blade. Use of a variable pitch auger blade to equalize withdrawal of material from the hopper obviously further aggravates the problem of utilizing the optimum of feed angle for the blade. It has also been proposed, for example as shown in U.S. Pat. to D'Amato, No. 2,967,056 issued Jan. 3, 1961, to make a material feed apparatus in the form of a plurality of blades disposed at an angle to the shaft to feed material to a discharge outlet in response to rotation of the shaft. However, in all prior material feeding apparatus using blades or interrupted flights which I am familiar with, the blades are spaced apart or pitched along the shaft at a uniform spacing with the result that material is nonuniformly withdrawn from the hopper beginning at the end of the feed member remote from the discharge outlet.

In some material feed apparatus it is necessary that the material feed member deliver the particulate material at very low rates as well as very high rates and a variable speed drive is provided for the feed member to vary the rate of feeding material. Problems are encountered, however, with the nonuniform rate of discharge of material during each revolution of the feed member when the feed member is rotating at very low speeds.

SUMMARY OF THE INVENTION

The present invention relates to an apparatus for feeding particulate material from a hopper including an elongated trough having an open top feed section communicating with the supply hopper and a metering section and a discharge outlet. An elongated rotary feed member extends along the trough and has feed vanes in the feed section for withdrawing material from the hopper and metering vanes in the metering section for feeding a measured quantity of the material to the discharge outlet during each revolution of the feed member. The feed vanes on the feed member are in the form of a plurality of individual feed blades attached to the shaft of the feed member and inclined to a radial plane through the feed member and the feed blades are arranged so as to have a spacing along the length of the feed member which is relatively closer adjacent the metering section than adjacent the end remote from the metering section, to effect withdrawal of material from the hopper along the length of the feed section. The feed blades can have a progressively increasing spacing between adjacent feed blades in a direction away from the metering section or, in order to simplify construction and reduce expense, can be arranged in groups with a stepped increase in spacing in a direction away from the metering section.

The invention also includes an improved arrangement for equalizing the discharge of material to the discharge outlet during each revolution of the feed member in the form of a plurality of axially spaced sets of flow equalizing blades on the feed member between the discharge outlet and the end of the metering vanes, with the blades of adjacent sets being angularly offset from each other.

Various important objects of this invention are to provide an apparatus for feeding particulate material from a supply hopper to a discharge outlet having an improved feed member construction for withdrawing material from the supply hopper along the length of the feed member; which minimizes compaction and bridging of the material as it is fed from the supply hopper; and which reduces the power required to feed a unit quantity of material from the hopper to the discharge outlet.

Another object of this invention is to provide an apparatus for feeding particulate material including a rotary feed member having an improved arrangement for equalizing the rate of discharge of material from the feed member to the discharge outlet during each revolution of the feed member.

These, together with other objects and advantages of this invention will be more readily understood by reference to the following detailed description when taken in connection with the accompanying drawings wherein:

FIG. 1 is a fragmentary view of a vehicle having a material feeding apparatus in accordance with the present invention applied thereto and shown in section along the plane 1—1 of FIG. 2;

FIG. 2 is a longitudinal vertical sectional view taken on the plane 2—2 of FIG. 1;

FIG. 3 is a transverse sectional view taken on the plane 3—3 of FIG. 2;

FIG. 4 is a transverse sectional view taken on the plane 4—4 of FIG. 2;

FIG. 5 is a longitudinal vertical sectional view through a modified form of material feed apparatus;

FIG. 6 is a fragmentary sectional view taken on the plane 6—6 of FIG. 5; and

FIG. 7 is a graph illustrating the rate of feed of material along the length of the feed member.

The material feeding apparatus of the present invention is particularly adapted for use with mobile spreading apparatus in which a material supply hopper is mounted on a vehicle such as a truck or a trailer. The material supply hopper may, for example, comprise a dump box 10 of a conventional dump truck T and the material feed apparatus 11 can be mounted at the rear of the dump box to receive material from the dump box as shown in FIG. 1. It is to be understood, however, that the material feed apparatus can be utilized with other material supply hoppers and may, for example, be utilized with the so-called V-box type hoppers in which event the material feeding apparatus can be arranged to extend longitudinally of the V-box adjacent the bottom thereof to receive material from the V-box and to convey the material to a discharge outlet adjacent one end of the V-box. The material feed apparatus is generally adapted for use in feeding particulate material including such relatively free flowing granular materials as salt, sand, gravel and fertilizer, as well as cinders etc.

The material feed apparatus in general includes an elongated trough 12 of generally U-shaped cross-section having a bottom 12a and upwardly extending side walls 12b and 12c, and which is open at the top at least along a major portion of its length. In the embodiment shown, the feed apparatus is arranged for use with a dump box type material supply hopper 10 and the trough is mounted adjacent the rear of the dump box at a level at or below the bottom of the dump box to receive material therefrom. As shown, the trough has end walls 13a and 13b and upwardly extending side panels 14a, 14b and a rear panel 14c for guiding material discharged through the open tailgate of the dump box into the trough.

The trough has a discharge opening 18 adjacent one end and an elongated feed member 21 for feeding material along the trough to the discharge outlet. The feed member includes a shaft 22 extending lengthwise of the trough and rotatably supported at its ends as by bearings 23 on the end members 13a, 13b. The shaft is adapted to be driven at a selectively variable speed to control the rate of feed of material from the supply hopper to the discharge outlet and, in the embodiments shown, the shaft is driven by an hydraulic motor 24 (FIG. 1) through a drive train (not shown) conveniently enclosed in a housing 25 at one end of the trough. As diagrammatically shown in FIG. 1, hydraulic fluid is supplied to the drive motor 24 for the feed member from a pump 28 through a flow control device 29 and line 31, a return line 32 being provided to return fluid from the motor 24 to a reservoir 33. Pump 28 can be driven in any suitable manner as by a separate motor or by a power takeoff from the truck engine and a relief valve 34 can be provided as shown in FIG. 1 to prevent overloading of the pump. In addition, a selectively operable diverter valve 35 is advantageously provided to enable selectively bypassing of the pump discharge through a bypass line 36 back to the reservoir when the material feed apparatus is not in use. Flow control device 39 is advantageously in the form of a pressure compensated flow control valve having an adjustable flow controller 29a. The adjustable flow controller 29a can be manually operated or can be of the type which is electrically operated under the control of a remote electrical actuator. Alternatively, the controller 29a can be adjustably positioned under the control of a servomechanism, such as disclosed in the U.S. Pat. to Wilder et al. No. 3,344,993 issued Oct. 3, 1967, which is operative to automatically adjust the speed of the feed member in accordance with the ground speed of the vehicle to maintain the speed of the feed member and hence the rate of feed of material correlative with the vehicle speed. A distributor, herein shown in the form of a rotary broadcast member 38 is commonly provided for spreading the material delivered to the discharge outlet 18. The broadcast member 38 is conveniently driven by an hydraulic motor 39 and fluid is supplied to the hydraulic motor 39 under a second flow control device 41 which is connected through a line 42 to the motor 39, and a return line 43 being provided and connected to the line 32 to return fluid to the reservoir.

The feed member 21 has a metering section designated M for feeding a preselected quantity of the material to the discharge outlet during each revolution of the feed member, and an elongated feed section F for withdrawing material from the hopper and for advancing the same to the metering section. In addition, the feed member is also advantageously provided with a flow equalizer section designated E for equalizing the rate of discharge of material through the discharge outlet 18, during each revolution of the metering section. In the embodiment illustrated wherein the material feeding apparatus is mounted at the rear of the dump box hopper to extend crosswise of the truck, it is necessary to limit the overall length of the trough to approximately the maximum width of the truck. In such installations, the discharge opening 18 and the metering and equalizing sections M and E of the feed member must be located inwardly of the end of the trough, and the feed section F has a length correspondingly less than the overall width of the dump box. It is to be understood, however, that in installations where the feed member extends longitudinally of the vehicle, such as in V-box hoppers, that the metering and equalizing sections can be located externally of the material supply hopper and the feed section formed with a length substantially equal to the length of the hopper. When the discharge opening and metering sections are located within the trough, a cover plate 44 is provided to prevent free flow of material from the hopper through the discharge opening and the cover plate extends from the end of the trough over the discharge opening and along the feed member a distance sufficient to prevent gravitational flow of material from the hopper through the discharge opening. Thus, the inner end 44a of the cover plate, when spaced a preselected height H above the bottom wall 12a of the trough, should be spaced inwardly of the end 18a of the discharge opening a distance at least H times the cotangent of the angle of repose of the material. For relatively free flowing granular materials such as salt, sand and the like, the angle of repose is about 30°.

In the embodiment shown in FIG. 5, the metering section M has a continuous helical vane 45 welded or otherwise rigidly secured to the shaft 22 adjacent the discharge outlet 18. Such a helical vane will advance a quantity of material generally corresponding to an annulus having inner and outer diameters corresponding to the inner and outer diameters of the vane 45 and a length corresponding to the pitch P of the vane along the shaft. For reasons pointed out hereinafter, the inlet end 45a of the metering vane 45 extends along the shaft a distance beyond the inner end 44a of the cover plate, and the outlet end 45b of the metering vane terminates inwardly of the end 18a of the discharge opening to accommodate the flow equalizer section E. The angle of the continuous vane 45 varies from the shaft to the outer tip of the vane. However, the pitch of the vane is selected in accordance with its outer diameter so that the effective angle of the vane with respect to the axis of the shaft is substantially less than 45° and preferably of the order of 20–35°. With this arrangement, the pitch P of the vanes 45 along the shaft is substantially less than the outer diameter of the metering vane so that the metering vane 45 extends along the shaft through substantially more than one and preferably two or more wraps.

The trough 12 in the region above the feed section F of the feed member is open at its top to communicate with the material supply hopper. The feed section is formed of a plurality of individual feed blades 48 which are rigidly secured to the shaft as by welding at spaced locations therealong and which are disposed at an acute angle to a radial plane through the shaft, to advance material along the feed trough toward the metering section as the shaft is rotated. It has been found that most efficient feeding of material along the shaft is achieved when the blades have their leading face inclined at an angle of greater than 20° and less than 35°, and preferably at approximately 30° with respect to a radial plane through the shaft. The feed blades 48 are arranged along the shaft so as to effect the withdrawal of material from the supply hopper along the length of the feed section to prevent unloading of one side of the supply hopper before the other. In the embodiment shown in FIG. 5, the feed blades 48 are spaced apart along the shaft with a progressively increasing spacing in a direction away from the metering section. During each revolution of the shaft 22, each feed blade advances a volume of material which generally corresponds to an annulus having inner and outer diameters corresponding to the inner and outer diameters of the feed blade and a length corresponding to the face area of the blade times the sine of the angle of the feed blade relative to a radial plane through the shaft. The feed blades are preferably all pitched at a uniform angle of greater than 20° and less than 35° with respect to a radial plane through the shaft, and preferably at an angle of about 30° for most efficient feeding of material. The rate of feed of material at each location along the feed section is then varied by selecting the spacing between adjacent feed blades 48 so that the spacing progressively increases in a direction away from the metering section to provide a progressively decreasing rate of feed as indicated by the line $f$ in the graph of FIG. 7. The feed blades 48 have an outer diameter substantially equal to the outer diameter of the metering vane 45 so that the tips of the metering and feed vanes extend uniformly adjacent the bottom of the trough. When the feed section of the rotary feed member communicates with the hopper along the entire length of the hopper, the rate of feed of material by the feed blades adjacent the metering section should be slightly less than the feed rate of the metering section to avoid compacting the material advanced by the feed section to the metering section. However, when the metering section extends into the hopper so that the feed section only communicates with a portion of the hopper, it is desirable that the rate of feed of material by the feed section to the metering section be substantially less than feed rate of the metering section. More specifically, in the apparatus illustrated, the feed section extends along about 70 percent of the width of the hopper and the rate of feed of material by the feed section at the end adjacent the metering section should be less than 70% of the feed rate of the metering section. With this arrangement, the portion of the metering section which extends beyond the end 44a of the cover plate 44 will withdraw material from the remaining 30% of the hopper, to substantially equalize withdrawal of material across the width of the hopper.

The volume of material advanced by the metering section per revolution can be generally expressed by the following formula:

$$Vm = \pi/4 \ (d_2^2 - d_1^2) \times P - t \tag{1}$$

Where $Vm$ is the volume of material advanced per revolution of the metering section; $d_2$ and $d_1$ are respectively the outer and inner diameters of the metering vane 45, and $P$ is the pitch of the metering vane along the shaft and $t$ the thickness of the vane. However, $t$ is very small and can be practically disregarded.

The volume of material advanced by each feed blade can be expressed by the following formula:

$$Vf = L \ W \sin a \tag{2}$$

Where $W$ is the width of each feed blade; $a$ is the angle of the feed blade 48 with respect to a radial plane through the shaft, and $L$ is the radial length of the feed blade.

Accordingly, the volume of material $Vfp$ which is advanced by the number of feed blades 48 along each length of the shaft corresponding to the pitch length $P$, can be expressed by the following formula:

$$Vfp = N_p \ L \ W \sin a \tag{3}$$

Where $N_p$ is the number of feed blades on each pitch length along the shaft.

Thus, at the end of the feed section adjacent the metering section, $Vfp$, should be about and preferably slightly less than 70 percent $Vm$ in the embodiment illustrated in FIG. 5. At a point medially between the ends of the trough, $Vfp$ should be about 50 percent $Vm$, etc.

The material feeding apparatus illustrated in FIG. 2 is similar to that illustrated in FIG. 3 and like numerals are used to designate corresponding parts, with the subscript (') used to identify modified parts. In FIG. 2, the feed member has a modified form of metering section and feed section. It has been found that the metering section does not have to be formed from a continuous helical vane and that it can instead be formed by a plurality of individual blades 45' arranged in a helical pattern on the shaft 22'. The metering blades 45', when arranged so that their adjacent edges are disposed in substantially the same radial plane as shown in FIG. 2, and with a blade width such as to form greater than 50 percent of the surface area of a continuous helix, will accurately feed substantially the same amount of material as a continuous helix, and with somewhat less variation in rate of feed per revolution at different auger speeds. The individual metering blade construction is also advantageous in that it can be fabricated at somewhat lower cost than the continuous vane metering section. As in the previously described construction, the inlet and 45a' of the metering section 45' extends beyond the cover plate 44' so as to communicate with the supply hopper and to be filled thereby. The outlet end 45b' also terminates at a point spaced from the discharge opening 18' to accommodate the flow equalizer section E.

While the progressive increasing of the spacing between the feed blades will achieve uniform withdrawal of material from the supply hopper along the length of the feed section, the progressive increasing in the spacing between the feed blades does complicate manufacture and increases the overall cost of making the feed member. It has been found that generally satisfactory results can be achieved by arranging the feed blades in groups of different pitch as shown at 48a' and 48b' in FIG. 2, provided the length of each uniform pitch feed section is not excessive, for example no more than about 3 feet so that material in the hopper can readily flow lengthwise of the trough to fill the auger. Thus, in the embodiment shown in FIG. 2, two feed sections F1 and F2 are provided, with the feed blades 48a' in the feed section F1 remote from the metering section being spaced apart axially of the shaft 22' a distance relatively greater than the spacing between the feed blades 48b' in the feed section F2 adjacent the metering section M. The spacing between the feed blades in each feed section is selected so that the average feed rate of the feed blades in that section is proportional to the length of that feed section in relation to the overall length of the hopper. For example, if the overall length of the feed sections F1 and F2 is about 70 percent of the length of the material supply hopper, and each feed section has a length of about 35% of the overall length of the supply hopper, then the spacing between the blades 48a' and the section F1 and the spacing between the blades 48b' and the section F2 is selected so that the feed rates F1 and F2 of the blades 48a' and 48b' have a step function somewhat as shown in FIG. 7 generally corresponding to the feed rate of the continuous pitch feed section shown in FIG. 5. Thus, if the feed section F1 extends through about 35 percent of the width of the supply hopper, then the feed rate of the blades 48a' of the feed section F1 should be somewhat less than 35 percent of the feed rate of the metering section M. Feed blades 48b' must advance all of the material from the blades 48a', and additionally withdraw a quantity of material from the hopper corresponding to the length of the feed section F2. If the feed section F2 also extends about 35 percent of the width of the supply hopper, then the feed blades 48b' should have a feed capacity somewhat less than 70 percent of the feed rate of the metering section M.

In the embodiments illustrated, the successive feed blades are shown attached to the shaft at equal angular positions around the shaft but with varying axial spacing along the shaft. The blades are herein shown attached at three different angular spacings so as to equalize the torque on the shaft. However, it is to be understood that the feed blades can be arranged circumferentially around the shaft at different angular locations, so long as the axial spacing between the blades along the shaft varies as previously described. For example, the blades can be arranged in a generally helical pattern along the shaft or, alternatively, the blades can be arranged in the form of a reverse helix, that is a helix that extends along the feed section of the shaft in a spiral opposite the direction of the helix of the metering section. It is also theoretically possible to locate all of the blades at one side of the shaft, but this is deemed objectionable in that it produces a nonuniform torque variation on the shaft.

It is frequently desired to spread relatively different quantities of material per unit of distance, for example per mile, and to also enable spreading of the same amount of material at widely different vehicle speeds. Accordingly, the feed auger must be capable of accurately delivering the material at widely different shaft speeds. It has been found, however, that the material discharged by a metering section formed by a continuous helical flight such as shown at 45 in FIG. 5, or by an interrupted helical flight such as shown at 45' in FIG. 2, will vary during each revolution, when the shaft is rotated at very low speeds. This nonuniform delivery of material during each revolution of the shaft, at low speeds, is objectionable in that it produces a cyclically varying rate of delivery and spread of the particulate material as the vehicle moves along the path. The flow equalizer section E has been provided to substantially equalize the rate of delivery of material from the metering section to the discharge outlet 18, during each revolution of the shaft. The flow equalizer section E is similar in both the embodiments of FIGS. 2 and 5 and includes a plurality of sets of equalizer blades designated 51, 52 and 53 located intermediate the outlet end 45b of the metering section M and the adjacent edge 18a of the discharge opening 18. Each set of blades includes a plurality of blades, preferably three or more in number at equal angular positions about the shaft 22. In addition, the blades of each set are angularly retarded, that is offset in a direction opposite the direction of rotation of the shaft relative to the blades of the preceding set, so that each set of blades functions to sequentially advance the material from the metering section to the discharge outlet 18. In addition, the inlet set of blades 51 is also advantageously arranged so that the blade adjacent the outlet end 45b of the metering section is angularly retarded or offset in a direction opposite the direction of rotation of the shaft from the end of the metering section. Preferably, the angle B that each set of blades is angularly offset with respect to the preceding set of blades and to the outlet end of the metering section can be expressed by the formula:

$$B = -360°/N_1\ N_2$$

Where $N_1$ is the number of blades in each set, and $N_2$ is the number of sets of blades and the negative sign indicates that the angle is opposite the direction of rotation of the feed member.

The flow equalizer blades of the several sets are herein shown pitched at the same angle, for example about 30° with respect to the longitudinal axis of the shaft. The use of a similar angle for each of the blades and the flow equalizer set facilitates manufacture. However, it has also been found advantageous to progressively increase the angle of the blades in a direction from the metering section toward the discharge outlet.

From the foregoing it is thought that the construction and operation of the material feed mechanism will be understood. The feed sections of the auger use feed blades inclined at a uniform feed angle between 20° and 35° and preferably about 30° to the axis of the shaft and the feed blades are spaced along the shaft so that the spacing between the blades is relatively greater adjacent the end of the feed section remote from the metering section. The spacing along the shaft is selected so as to achieve generally uniform withdrawal of material from the material supply hopper along the length of the feed apparatus. The flow equalizer section at the outlet end of the metering section functions to equalize the rate of discharge of material from the metering section to the discharge outlet during each revolution of the shaft so as to avoid pulsations in discharge.

The embodiments of the invention in which an exclusive property or privilege is claimed are defined as follows:

1. In an apparatus for feeding particulate material including a material supply hopper, an elongated trough having an open top material feed section communicating with said material supply hopper and a material metering section communicating with one end of said feed section and having a discharge outlet adjacent the end of the metering section remote from said feed section, an elongated material feed member including a shaft means extending along said metering section and said feed section and having feed vane means in said feed section for feeding material therealong to said metering section and metering vane means in said metering section for advancing a preselected amount of material along the metering section to the discharge outlet during each revolution of the shaft means, and means for rotating the shaft means in one direction, the improvement wherein said feed vane means comprises a plurality of individual feed blades each secured to said shaft means at spaced locations threalong and each having a feed face inclined at substantially the same acute angle to a radial plane through the shaft means to advance material along the feed section of the trough toward the metering section when the shaft means is rotated in said one direction, the plurality of feed blades having a uniform outer diameter and the spacing between the feed blades measured in a direction axially of the shaft means being less in the portion of the feed section adjacent the metering section when in the portion of the feed section remote from the metering section whereby the feed blades withdraw material from the supply hopper along the length of the feed section.

2. An apparatus for feeding particulate material according to claim 1 wherein said acute angle of the feed face of the feed blades is between 20° and 35°.

3. An apparatus for feeding particulate material according to claim 1 wherein said acute angle of the feed face of the feed blades is about 30°.

4. An apparatus for feeding particulate material according to claim 1 wherein the spacing between the feed blades progressively increases in a direction away from the metering section.

5. An apparatus for feeding particulate material according to claim 1 wherein the spacing between the feed blades increases in step fashion in a direction away from the metering section.

6. In an apparatus for feeding particulate material according to claim 1 wherein the metering vane means comprises a continuous helical vane extending along said shaft means a distance greater than one pitch of the helical vane to advance a volume of material during each revolution correlative with the pitch of the helix.

7. In an apparatus for feeding particulate material according to claim 1 wherein said metering vane means comprises a plurality of individual metering blades each attached to said shaft means at a preselected acute angle to a radial plane through the shaft means, said metering blades being arranged in a helical pattern extending along the shaft means a distance greater than one pitch of the helix.

8. In an apparatus for feeding particulate material according to claim 1 wherein said metering vane means is arranged in a helical pattern on said shaft means to advance a preselected volume of material during each revolution of the shaft means correlative with the pitch of the helical pattern metering vane means, the feed blade means on the shaft means adjacent the metering vane means being spaced apart in a direction axially of the shaft means a distance to advance a volume of material to the metering vane means which is substantially less than said preselected volume.

9. An apparatus for feeding particulate material according to claim 1 wherein said metering vane means is arranged in a helical pattern on said shaft means and has an outlet end thereof spaced from said discharge outlet, and flow equalizing vane means on said shaft means between the discharge outlet end of said metering vane means and said discharge outlet, said flow equalizing vane means including a plurality of sets of flow equalizing blades spaced axially along the shaft means with a plurality of blades in each set angularly spaced about the shaft means and with each flow equalizing blade inclined at an acute angle to a radial plane through the shaft means.

10. In an apparatus for feeding particulate material including a material supply hopper, an elongated trough having an open top material feed section communicating with said material supply hopper and a material metering section communicating with one end of said feed section and having a discharge outlet adjacent the end of the metering section remote from said feed section, an elongated material feed member including a shaft means extending along said metering section and said feed section and having feed vane means in said feed section for feeding material therealong to said metering section and metering vane means in said metering section for advancing a preselected amount of material along the metering section to the discharge outlet during each revolution of the shaft means, and means for rotating the shaft means in one direction, the improvement wherein said feed vane means comprises a plurality of individual feed blades each secured to said shaft means at spaced locations therealong and each having a feed face inclined at substantially the same acute angle to a radial plane through the shaft means to advance material along the feed section of the trough toward the metering section when the shaft means is rotated in said one direction, the plurality of feed blades having a uniform outer diameter and the spacing between the feed blades measured in a direction axially of the shaft means being less in the portion of the feed section adjacent the metering section than in the portion of the feed section remote from the metering section whereby the feed blades withdraw material from the supply hopper along the length of the feed section, said metering vane means being arranged in a helical pattern on said shaft means and having an outlet end thereof spaced from said discharge outlet, and flow equalizing vane means on said shaft means between the discharge outlet end of said metering vane means and said discharge outlet, said flow equalizing vane means including a plurality of sets of flow equalizing blades spaced axially along the shaft means with a plurality of blades in each set angularly spaced about the shaft means and with each flow equalizing blade inclined at an acute angle to a radial plane through the shaft means, the blades in each set of flow equalizing blades being angularly offset about the axis of said shaft means relative to the blades of an adjacent set.

11. In an apparatus for feeding particulate material including a material supply hopper, an elongated trough having an open top material feed section communicating with said material supply hopper and a material metering section communicating with one end of the said feed section and having a discharge outlet adjacent the end of the metering section remote from said feed section, an elongated material feed member including a shaft means extending along said metering section and said feed section and having feed vane means in said feed section for feeding material therealong to said metering section and metering vane means in said metering section for advancing a preselected amount of material along the metering section to the discharge outlet during each revolution of the shaft means, and means for rotating the shaft means in one direction, the improvement wherein said feed vane means comprises a plurality of individual feed blades each secured to said shaft means at spaced locations therealong and each having a feed face inclined at an acute angle to a radial plane through the shaft means to advance material along the feed section of the trough toward the metering section when the shaft means is rotated in said one direction, the spacing between the feed blades measured in a direction axially of the shaft means being less in the portion of the feed section adjacent the metering section than in the portion of the feed section remote from the metering section whereby the feed blades withdfaw material from the supply hopper along the length of the feed section, said metering vane means being arranged in a helical pattern on said shaft means and having an outlet end thereof spaced from said discharge outlet, and flow equalizing vane means on said shaft means between the discharge outlet end of said metering vane means and said discharge outlet, said flow equalizing vane means including a plurality of sets of flow equalizing blades spaced axially along the shaft means with a plurality of blades in each set angularly spaced about the shaft means and with each flow equalizing blade inclined at an acute angle to a radial plane through the shaft means, the blades in each set of flow equalizing blades, beginning with the set adjacent the discharge outlet, being angularly offset in a direction opposite the direction of rotation of the shaft means from the blades in the preceding set of flow equalizing blades at an angle of about $360°/N_1 N_2$, where $N_1$ is the number of flow equalizing blades in each set and $N_2$ is the number of sets of blades.

12. An apparatus for feeding particulate material according to claim 1 wherein said material supply hopper communicates with said trough along substantially the entire length of the latter, cover plate means in said trough overlying said discharge opening and a portion of said metering section to prevent gravitational flow of material from the hopper to the discharge opening, said metering vane means being arranged on said shaft means in a helical pattern of uniform pitch and having the end thereof remote from the discharge opening extending beyond said cover plate means to assure filling of the metering vane means with material.

13. In an apparatus for feeding particulate material including a material supply hopper, an elongated trough having an open top material feed section communicating with said material supply hopper and material metering section communicating with one end of the said feed section and having a discharge outlet adjacent the end of the metering section remote from said feed section, an elongated material feed member including a shaft means extending along said metering section and said feed section and having feed vane means in said feed section for feeding material therealong to said metering section and metering vane means in said metering section for advancing a preselected amount of material along the metering section to the discharge outlet during each revolution of the shaft means, and means for rotating the shaft means in one direction, the improvement wherein said metering vane means is arranged on said shaft means in a helical pattern and has an outlet end thereof spaced from said discharge outlet, and flow equalizing vane means on said shaft means between the discharge outlet and the metering vane means, said flow equalizing vane means including a plurality of sets of flow equalizing blades spaced axially along the shaft means with a plurality of blades in each set angularly spaced about the shaft means and with each flow equalizing blade inclined at an acute angle to a radial plane through the shaft means and angularly offset relative to the blades of an adjacent set.

14. In an apparatus for feeding particulate material including a material supply hopper, an elongated trough having an open top material feed section communicating with said material supply hopper and material metering section communicating with one end of said feed section and having a discharge outlet adjacent the end of the metering section remote from said feed section, an elongated material feed member including a shaft means extending along said metering section and said feed section and having feed vane means in said feed section for feeding material therealong to said metering section and metering vane means in said metering section for advancing a preselected amount of material along the metering section to the discharge outlet during each revolution of the shaft means, and means for rotating the shaft means in one direction, the improvement wherein said metering vane means is arranged on said shaft means in a helical pattern and has an outlet end thereof spaced from said discharge outlet, and flow equalizing vane means on said shaft means between the discharge outlet and the metering vane means, said flow equalizing vane means including a plurality of sets of flow equalizing blades spaced axially along the shaft means with a plurality of blades in each set angularly spaced about the shaft means with each flow equalizing blade inclined at an acute angle to a radial plane through the shaft means and angularly offset relative to the blades of an adjacent set, the blades in each set of flow equalizing blades, beginning with the set adjacent the discharge outlet, being angularly offset in a direction opposite the direction of rotation of the shaft means from the blades in the preceding set of flow equalizing blades at an angle of about $360°/N_1 N_2$, where $N_1$ is the number of flow equalizing blades in each set and $N_2$ is the number of sets of blades.

* * * * *